(12) United States Patent
Burch

(10) Patent No.: US 7,270,316 B2
(45) Date of Patent: Sep. 18, 2007

(54) DISTILLATION COLUMN TRAY CONFIGURATION

(76) Inventor: Joseph Michael Burch, 4083 Emil St., Robstown, TX (US) 70370

( * ) Notice: Subject to any disclaimer, the term of this patent is extended or adjusted under 35 U.S.C. 154(b) by 166 days.

(21) Appl. No.: 11/148,069

(22) Filed: Jun. 8, 2005

(65) Prior Publication Data

US 2005/0275121 A1 Dec. 15, 2005

Related U.S. Application Data

(60) Provisional application No. 60/578,155, filed on Jun. 9, 2004.

(51) Int. Cl.
*B01F 3/04* (2006.01)

(52) U.S. Cl. .............. 261/114.1; 261/114.5; 202/158

(58) Field of Classification Search .. 261/114.1–114.5; 202/158

See application file for complete search history.

(56) References Cited

U.S. PATENT DOCUMENTS

| | | | | |
|---|---|---|---|---|
| 169,970 A * | 11/1875 | Deymann et al. | ......... | 261/114.1 |
| 545,392 A * | 8/1895 | Tracy | ................ | 261/114.1 |
| 2,420,075 A | 5/1947 | Glitsch | ................ | 261/114 |
| 2,491,726 A | 12/1949 | Glitsch | ................ | 189/34 |
| 2,510,590 A * | 6/1950 | Kraft | ................ | 261/114.1 |
| 2,540,781 A | 2/1951 | Glitsch | ................ | 24/243 |
| 2,565,355 A | 8/1951 | Cook | ................ | 261/114 |
| 2,582,657 A | 1/1952 | Serner | ................ | 261/114 |
| 2,582,826 A | 1/1952 | Glitsch | ................ | 189/34 |
| 2,591,249 A | 4/1952 | Eld | ................ | 261/113 |
| 2,596,249 A | 5/1952 | Kerrigan | ................ | 261/114 |
| 2,646,977 A | 7/1953 | Kraft | ................ | 261/114 |
| 2,692,128 A | 10/1954 | Bowles | ................ | 261/114 |
| 2,693,949 A | 11/1954 | Huggins | ................ | 261/114 |
| 2,699,929 A | 1/1955 | Bowles | ................ | 261/114 |
| 2,714,504 A | 8/1955 | Bowles | ................ | 261/114 |
| 2,772,748 A * | 12/1956 | Manning, Jr. | ................ | 95/216 |
| 3,053,521 A * | 9/1962 | Plaster et al. | ................ | 261/114.1 |
| 3,231,251 A * | 1/1966 | Scheibel | ................ | 261/114.1 |
| 3,573,172 A | 3/1971 | Streuber | ................ | 202/158 |
| 3,633,883 A | 1/1972 | McGlothlin | ................ | 261/114 |
| 3,700,216 A | 10/1972 | Uitti et al. | ................ | 261/114 R |
| 4,174,363 A | 11/1979 | Bruckert | ................ | 261/114 TC |
| 4,275,021 A | 6/1981 | Kirkpatrick et al. | .... | 261/114 JP |
| 4,278,621 A | 7/1981 | Sigmund et al. | ........ | 261/114 R |
| 4,301,098 A | 11/1981 | Mix | ................ | 261/114 R |
| 4,442,048 A | 4/1984 | Abernathy et al. | ..... | 261/114 R |
| 4,504,426 A | 3/1985 | Chuang et al. | ........ | 261/114 R |
| 4,510,023 A | 4/1985 | Bennett et al. | ................ | 203/99 |
| 4,826,574 A * | 5/1989 | Gourlia et al. | ................ | 202/158 |
| 4,956,127 A | 9/1990 | Binkley et al. | ................ | 261/114.1 |
| 5,047,179 A | 9/1991 | Nye | ................ | 261/114.1 |
| 5,106,556 A * | 4/1992 | Binkley et al. | ................ | 261/114.1 |
| 5,164,125 A | 11/1992 | Binkley et al. | ................ | 261/114.1 |
| 5,242,628 A | 9/1993 | Nye | ................ | 261/114.1 |
| 5,277,847 A * | 1/1994 | Gentry et al. | ................ | 261/114.1 |
| 5,453,222 A * | 9/1995 | Lee et al. | ................ | 261/114.1 |
| 5,547,617 A * | 8/1996 | Lee et al. | ................ | 261/114.5 |
| 6,460,833 B2 * | 10/2002 | Konijn | ................ | 261/114.1 |

* cited by examiner

*Primary Examiner*—Scott Bushey
(74) *Attorney, Agent, or Firm*—Kenneth H. Johnson

(57) ABSTRACT

A new tray configuration for a distillation column that utilizes the entire column cross section area as active tray area for vapor/liquid contact. The new tray configuration has no downcomers and utilizes a liquid/vapor seal pan(s) located in the vapor space of the adjoining tray to collect liquid from the tray, provide entrained vapor disengaging, distribute liquid from one active tray to another and provide a liquid and vapor seal between contact trays.

16 Claims, 2 Drawing Sheets

DISTILLATION COLUMN TRAY CONFIGURATION

BACKGROUND OF THE INVENTION

This application claims the benefit of provisional application 60/578,155, filed Jun. 9, 2004.

FIELD OF THE INVENTION

The present invention relates to an improved distillation column which eliminates conventional downcomer assemblies for liquid distribution and utilizes this area as an active area for vapor/liquid contact on the tray. More particularly the invention relates to liquid downflow which does not utilize any portion of the tray area.

RELATED ART

In a distillation column there are usually multiple plates or trays for vapor/liquid contact. The liquid moves downward through the column from tray to tray while the vapor moves upward through a device on the tray that facilitates contact with the liquid on the tray. The liquid moves downward through the column due to gravity and liquid head while the vapor moves upward through the column due to the differential pressure between the trays. When the liquid and vapor contact each other on the tray, mass transfer occurs. The result is the lighter components are concentrated in the overhead of the tower and the heavier components are concentrated in the lower part of the tower.

The majority of all distillation columns control the distribution of the liquid through the column by means of downcomers. Liquid flows horizontally across a tray driven by liquid head in the downcomer on the inlet of the tray. This liquid is collected in a second downcomer on the outlet of the tray after it has contacted the rising vapors. The downcomers serve three primary purposes, liquid collection, providing liquid head for flow across the tray and to provide a disengaging area for entrained vapors from the tray. The disadvantage to the distillation process in the column is that the downcomers nominally occupy 10% to 30% of the cross sectional area of the column. This effectively reduces the active area available for vapor/liquid contact. The active area of the tray is of major concern as it determines the vapor handling capacity of the tower as well as the overall energy requirement and efficiency of the distillation operation.

The prior art and tray designers have been aware of this limitation for years and have made numerous improvements and patents relating to downcomer designs to facilitate the use of the downcomer area for vapor/liquid contact. These improvements have increased the overall efficiency of the distillation system but there is no substitute for the efficiency and contact from the active area of a tray. Other prior art discloses designs and patents for columns without downcomers that utilize a dual flow or co-flow design where the liquid flows downward through the same contacting device as the upward rising vapor on the active area of a tray. These designs can lead to lower tray efficiencies since the liquid and vapor use the same contact device for distribution as well as a reduction in column loading flexibility. The present invention increases the effective active tray area in the column.

SUMMARY OF THE INVENTION

Briefly the present invention is an improved distillation column tray (reconfigured tray) comprising a contact tray extending over less than the entire area of a cross section of said column, a weir along an outlet side of said tray, a liquid collection area below said outlet side for collecting liquid from said tray. A plurality of the present reconfigured trays arrayed along the column effectively utilizes the entire cross sectional area of the column for each pairing of two adjacent reconfigured trays as the active tray area for vapor/liquid contact while maintaining the liquid distribution across the tray to the next distillation tray. The liquid flowing down the column does not rely on the contacting device to flow to the next contact tray. The liquid collection area is used to form a liquid/vapor seal with an adjacent tray.

For a conventional single pass tray arrangement, this may be achieved by utilizing an array of trays with 50% of the cross sectional area of the column to collect the liquid from a previous tray and contact the liquid with the rising vapors. The liquid from each tray is collected in a liquid/vapor seal pan below the outlet of the tray and distributed to the next distillation tray. The liquid/vapor seal pan is located in the vapor area of the next distillation tray and does not occupy the active area on the distillation tray.

DETAIL DESCRIPTION OF THE INVENTION AND PREFERRED EMBODIMENTS

The liquid/vapor seal pan achieves several objectives. It collects the outlet liquid from a tray, provides for entrained vapor disengaging, distributes liquid to the next distillation tray and provides a liquid and vapor seal to separate the liquids and vapors from the adjacent trays. With the use of the liquid/vapor seal pan, a typical single pass distillation tray on 24 inch spacing is reconfigured to two trays staggered on 12 inch spacing. Liquid flows horizontally from tray to tray throughout the column. With the vapor seal, vapor from the bottom of the column is split into two streams with each stream rising upward through the column contacting the liquid on each tray. Tray spacing for the vapor from tray to tray remains at 24 inches to provide the required vapor disengaging space.

Air/Water stripping tests for a conventional 3 stage single pass 18" diameter column with downcomers resulted in an overall modified Murphree tray efficiency of 15%. For the present reconfigured tray column with 6 contact stages, the overall modified Murphree tray efficiency was 27%.

Process simulations for various hydrocarbon distillation processes as well as sour water stripping systems have been completed for conventional distillation column tray configurations and compared to the present tray column configuration. Results of the simulations indicate a 10 to 30% decrease in the energy requirement for a given distillation specification using the overall modified Murphree tray efficiency for the conventional (base case) system. This reduction in the energy requirement for a given separation would also be directly proportional to additional throughput that could be gained at a base case energy usage. It is contemplated hydrocarbon and sour water stripping distillations with the present tray configuration will provide additional reductions in the energy requirement or additional throughput can be gained for a given separation based on the increase in tray efficiencies realized in the Air/Water tests.

Figure 1:
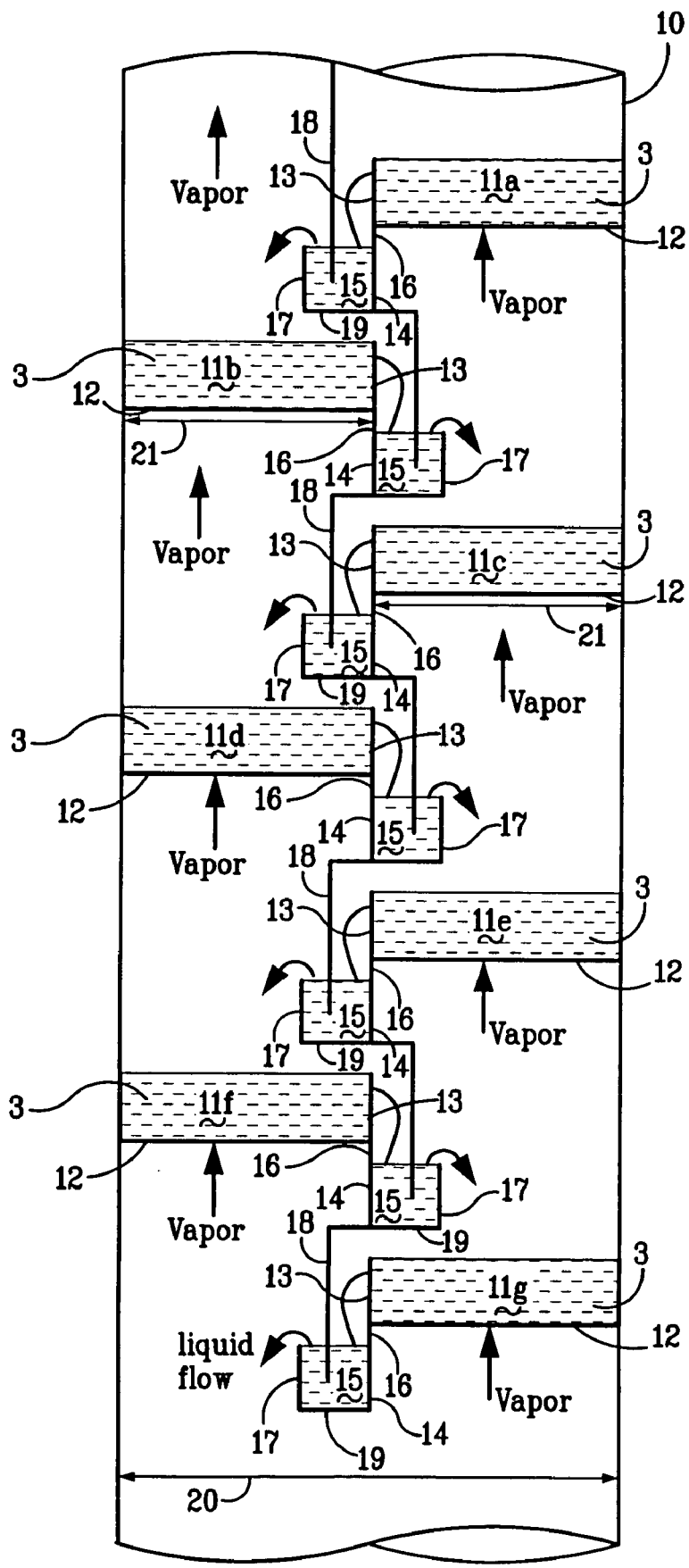
FIG. 1 is a schematic representation of a partial cross sectional view of a present reconfigured tray distillation column without downcomers.

In FIG. 1 the schematic represents a partial section of a view of a present reconfigured tray distillation column without downcomers. A plurality of the reconfigured trays 11a-g(each comprised of a contact tray 12, a weir 13, a component 14) are arrayed along a column 10, shown as contact trays 12 containing a liquid 3, held on the tray by weir 13 and overflowing into liquid/vapor seal component 14. The liquid/vapor seal component is formed by a trough 15 positioned below a tray 12 by solid member 16, and solid member 18, which extends from a preceding and adjacent reconfigured tray into the trough below side 17 (servers as a weir) and spaced away from the bottom 19 to allow liquid flow through the trough. Each trough is positioned above the contact tray of an adjacent lower reconfigured tray so not to utilize any portion of the effective area of that next lower contact tray. The effective active area on the tray(s) which is equal to the total cross sectional area of the column 20 is represented by the area which is the combination of the active areas 21 of two adjacent reconfigured trays which are spaced vertically in the column at preferably 50% of the distance of full conventional trays, e.g., 12" instead of 24". The liquid flow and vapor flow are shown by arrows.

Figure 2:
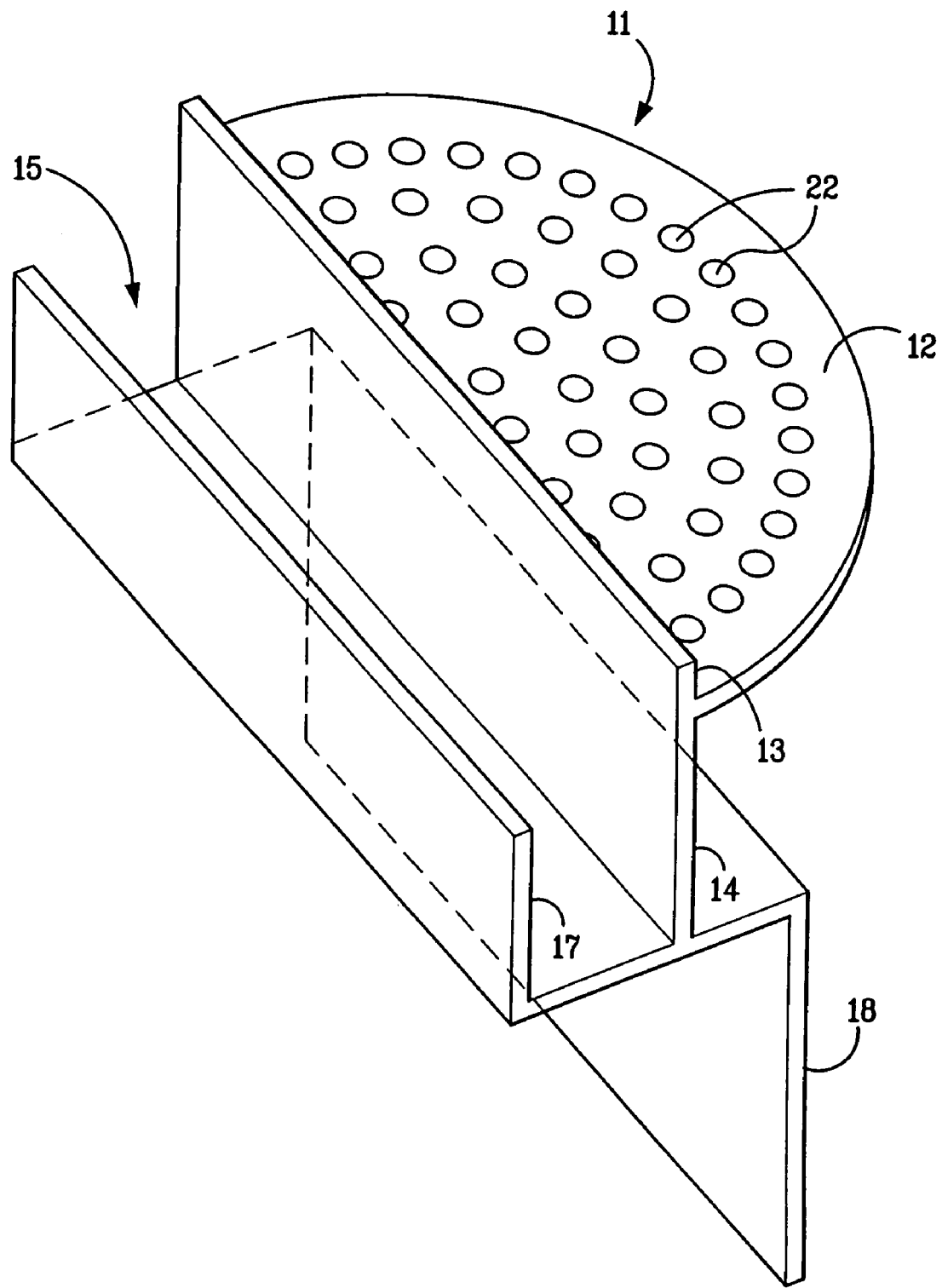
FIG. 2 is an isometric view of one embodiment of the invention distillation tray.

FIG. 2 shows one embodiment of the present distillation tray 11. The contact tray 12 is shown with openings 22 over its surface with the weir 13. The trough 15 is formed by component 14, bottom 19 and side 17, and solid member 18 each of which extend the full length of the contact tray and thus all extend across the column when the distillation tray 11 is in place and provide the major elements of the vapor barrier in the column to produce the dual vapor flow described.

Many variations of the conventional elements of the present reconfigured trays are possible, for example, the contact trays may be any of the conventional trays and others developed hereafter, such as bubble cap, sieve, etc., and the weirs, may be of varying heights and configurations.

In a preferred embodiment of the present invention the reconfigured trays for placement in a distillation column of a given cross section comprise: a first contact tray extending over less than the entire area of the cross section of said distillation column, a weir along an outlet side of said first contact tray, a liquid collection area below said outlet side for collecting liquid from said first contact tray, said liquid collection area comprising a trough extending from the said tray and connected thereto by a first solid member and a second solid member extending into said trough from; a second contact tray positioned above and adjacent to said first contact tray, said second contact tray and extending over less than the entire area of the cross section of said distillation column, a weir along an outlet side of said second contact tray, a liquid collection area below said outlet side for collecting liquid from said second contact tray, said liquid collection area comprising a trough extending from the said second contact tray and connected thereto by a third solid member and spaced above said first contact tray for delivery of liquid to said first contact tray. Preferably adjacent reconfigured trays will be positioned in the column such that the contact trays are not aligned. Preferably the liquid collection area of a reconfigured tray will align with an adjacent contact tray when the reconfigured trays are positioned in a column.

The invention claimed is:

1. An improved distillation column having a cross section comprising: a first distillation tray comprising a first contact tray extending over less than the entire area of a cross section of said distillation column, a first weir along an outlet side of said first contact tray, a first liquid collection area below said first outlet side for collecting liquid from said first contact tray, said first collection area being positioned in a vapor area of a second distillation tray positioned below said first distillation tray, said second distillation tray comprising a second contact tray extending over less than the entire area of the cross section of said distillation column, a second weir along an outlet side of said second contact tray, a liquid second collection area below said outlet side for collecting liquid from said second contact tray wherein said second contact tray extends over the area of the cross section of said distillation column not covered by said first contact tray, whereby the area of the distillation column covered by the combined area said first contact tray and said second contact tray corresponds to the entire cross section of said distillation column.

2. The improved distillation column according to claim 1 wherein the first liquid collection area forms a liquid/vapor seal between the first distillation tray the second distillation tray.

3. The improved distillation column according to claim 1 wherein a plurality of distillation trays each comprising a contact tray extending over less than the entire area of the cross section of said distillation column, a weir along an outlet side of said contact tray, a liquid collection area below said outlet side for collecting liquid from said contact tray, are arrayed vertically in said distillation column and each said collection area is positioned in a vapor area of a lower positioned distillation tray, whereby the area of the distillation column covered by the combined area of vertically adjacent pairs of said plurality of contact trays corresponds to the entire cross section of said distillation column.

4. The improved distillation column according to claim 3 wherein each liquid collection area forms a liquid/vapor seal with a lower adjacent tray.

5. An improved distillation column having a cross section comprising: a first distillation tray comprising a first contact tray extending over less than the entire area of a cross section of said distillation column, a first weir along an outlet side of said first contact tray, a first liquid collection area below said first outlet side for collecting liquid from said first contact tray, said first collection area being positioned in a vapor area of a second distillation tray positioned below said first distillation tray, said second distillation tray comprising a second contact tray extending over less than the entire area of the cross section of said distillation column, a second weir along an outlet side of said second contact tray, a liquid second collection area below said outlet side for collecting liquid from said second contact tray wherein each of said contact trays occupy 50% of the cross sectional area of the distillation column.

6. An improved distillation column having a cross section comprising: a first distillation tray comprising a first contact tray extending over less than the entire area of a cross section of said distillation column, a first weir along an outlet side of said first contact tray, a first liquid collection area below said first outlet side for collecting liquid from said first contact tray, said first collection area being positioned in a vapor area of a second distillation tray positioned below said first distillation tray, said second distillation tray comprising a second contact tray extending over less than the entire area of the cross section of said distillation column, a second weir along an outlet side of said second contact tray, a liquid second collection area below said outlet side for collecting liquid from said second contact tray wherein a plurality of distillation trays each comprising a contact tray extending over less than the entire area of the cross section of said distillation column, a weir along an outlet side of said contact tray, a liquid collection area below said outlet side for collecting liquid from said contact tray, are arrayed vertically in said distillation column and each said collection area is positioned in a vapor area of a lower positioned distillation tray, whereby the area of the distillation column covered by the combined area of vertically adjacent pairs of said plurality of contact trays corresponds to the entire cross section of said distillation column and each of said plurality of contact trays occupy 50% of the cross sectional area of the distillation column.

7. An improved distillation column having a cross section comprising: a first distillation tray comprising a first contact tray extending over less than the entire area of a cross section of said distillation column, a first weir along an outlet side of said first contact tray, a first liquid collection area below said first outlet side for collecting liquid from said first contact tray, said first collection area being positioned in a vapor area of a second distillation tray positioned below said first distillation tray, said second distillation tray comprising a second contact tray extending over less than the entire area of the cross section of said distillation column, a second weir along an outlet side of said second contact tray, a liquid second collection area below said outlet side for collecting liquid from said second contact tray wherein said first liquid collection area comprises a first solid member extending from the first contact tray and laterally across said column, a bottom and a side to form a trough, and having a second solid member extending from above into said trough and laterally across said column, whereby a vapor barrier is formed between said first distillation tray and said second distillation tray with liquid in the collection area.

8. An improved distillation column comprising a plurality of distillation trays each comprising a contact tray extending over less than the entire area of the cross section of said distillation column, a weir along an outlet side of said tray, a liquid collection area below said outlet side for collecting liquid from said contact tray, are arrayed vertically in said distillation column and each said collection area is positioned in a vapor area of a lower positioned distillation tray, whereby the area of the distillation column covered by the combined area of vertically adjacent pairs of said contact trays of the plurality of distillation trays corresponds to the entire cross section of said distillation column, each liquid collection area forming a liquid/vapor seal between each pair of an upper and lower adjacent distillation trays and each of said contact trays of the plurality of distillation trays occupy 50% of the cross sectional area of the distillation column, each said liquid collection area comprising a first solid member extending from an upper distillation tray and laterally across said column, a bottom and a side to form a trough, and having a second solid member extending from above into said trough and laterally across said column, whereby a vapor barrier is formed between said upper distillation tray and an adjacent lower distillation tray with liquid in the collection area.

9. A distillation tray for use in a distillation column, having a cross section and containing a plurality of distillation trays each extending over less than the entire area of the cross section of said distillation column arrayed vertically in distillation column whereby the area of the distillation column covered by the combined area of vertically adjacent pairs of said plurality of distillation trays corresponds to the entire cross section of said distillation column, and having a liquid/vapor seal between each pair of an upper and lower adjacent distillation trays, comprising:

a contact tray which extends over 50% of the entire area of a cross section of said distillation column, a weir along an outlet side of said contact tray, a first liquid collection area below said first outlet side for collecting liquid from said first contact tray.

10. The distillation tray according to claim 9 wherein said liquid collection area comprises a first solid member extending from and along the contact tray, a bottom and a side to form a trough, and having a second solid member extending from and laterally along a lower edge of said trough.

11. The improved distillation column according to claim 5 wherein the first liquid collection area forms a liquid/vapor seal between the first distillation tray the second distillation tray.

12. The improved distillation column according to claim 5 wherein a plurality of distillation trays each comprising a contact tray extending over less than the entire area of the cross section of said distillation column, a weir along an outlet side of said contact tray, a liquid collection area below said outlet side for collecting liquid from said contact tray, are arrayed vertically in said distillation column and each said collection area is positioned in a vapor area of a lower positioned distillation tray, whereby the area of the distillation column covered by the combined area of vertically adjacent pairs of said plurality of contact trays corresponds to the entire cross section of said distillation column.

13. The improved distillation column according to claim 12 wherein each liquid collection area forms a liquid/vapor seal with a lower adjacent tray.

14. The improved distillation column according to claim 6 wherein the first liquid collection area forms a liquid/vapor seal between the first distillation tray the second distillation tray.

15. The improved distillation column according to claim 6 wherein a plurality of distillation trays each comprising a contact tray extending over less than the entire area of the cross section of said distillation column, a weir along an outlet side of said contact tray, a liquid collection area below said outlet side for collecting liquid from said contact tray, are arrayed vertically in said distillation column and each said collection area is positioned in a vapor area of a lower positioned distillation tray, whereby the area of the distillation column covered by the combined area of vertically adjacent pairs of said plurality of contact trays corresponds to the entire cross section of said distillation column.

16. The improved distillation column according to claim 15 wherein each liquid collection area forms a liquid/vapor seal with a lower adjacent tray.

* * * * *